United States Patent Office 2,714,063
Patented July 26, 1955

2,714,063

METHOD AND COMPOSITION FOR THE CONTROL OF UNDESIRED VEGETATION

Arthur W. Swezey, Garden Grove, Calif., assignor to The Dow Chemical Company, Midland, Mich., a corporation of Delaware No Drawing. Application November 23, 1951,
Serial No. 257,940

7 Claims. (Cl. 71—2.3)

This invention is concerned with the control of undesired vegetation and is particularly directed to a composition and method for preventing the growth of seedlings.

Sterilization of soil, as by the use of large amounts of salt, has been practiced on occasion since ancient times. More recently other inorganic materials such as the chlorates, arsenites, and borax have found specialized uses in the control of undesired vegetation but the concept of selective chemical control of weeds or other noxious vegetation is of fairly recent origin. The wide acceptance of chemical weed control practice has highlighted certain deficiencies in commonly recommended procedures. Thus, the herbicidal chemicals currently used are frequently applied as sprays or dusts to vegetation in an advanced stage of growth and at a time when weeds have already depleted the soil of moisture and nutrients. Moreover, applications of such chemicals to mature weed growth is limited by the possibility of injury to interplanted crop plants or to adjacent desirable vegetation.

It is an object of the present invention to provide an improved method for the control of undesired vegetation. A further object is to provide a method for control of vegetation before it has had an opportunity to deplete soil reserves of nutrients and moisture. Another object is to provide a method for accomplishing the temporary sterilization of soil areas. Yet another object is to provide for accomplishing the control of undesired vegetation while decreasing the likelihood of injury to nearby desirable plants. An additional object is the provision of a novel composition adapted to be employed for the accomplishment of the indicated herbicidal control. Other objects will become apparent from the following specification and claims.

In accordance with the present invention, it has been dicovered that seedlings of many plants are controlled by contacting the plant or plant parts with a chloroaryloxypropanol of the formula

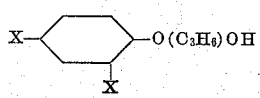

wherein one X is chlorine and the other X is hydrogen or a methyl radical. These compounds have been found to be particularly active when in contact with the roots of newly germinated seedlings, especially those of broadleafed plants. On the other hand, they have been found to be not particularly active in their effect on the aerial portion of mature plants in comparison to the conventional plant growth control agents such as the naphthoxy and haloaryloxy aliphatic acids. Thus, by the use of the compounds of the present invention, the control of undesired seedlings may be accomplished while largely avoiding the possibility of injury to the succulent leaf and stem portions of well developed or mature desirable vegetation.

In operating in accordance with the invention, the toxic compound is distributed in or on soil or other growth medium such as peat or compost ordinarily infested with the seeds of the vegetation concerned. Any suitable means of distribution may be used provided that the active compound is positioned so that the roots or other tender growth organs of the newly germinated seedlings are subjected to the action of the chloroaryloxy propanol. The results to be obtained are largely determined by the amount of the propanol compound applied to a given area of growth medium. When using large amounts of the active compounds a temporary sterilization of the growth medium is obtained whereas with suitable smaller dosages a selective herbicidal effect is achieved since there appears to be a considerable specificity of action with respect to the seedlings of the broadleafed as against the narrowleafed plants. Under normal conditions of moisture, aeration, and bacterial action, the herbicidal effect of reasonable dosages of the toxicant is dissipated within a few weeks.

In carrying out the invention, the chloroaryloxy propanols may be compounded to form either dust or spray compositions. A preferred embodiment of the invention includes mixtures of the active ingredient with a finely divided inert solid such as talc, pyrophyllite, gypsum, diatomaceous earth, and the like. Similarly, combinations of the chloroaryloxy propanols with fertilizers or other soil conditioners may be employed.

Where the mixture with a solid diluent is to be applied as a dust, the inclusion of wetting, sticking and emulsifying agents in the above described finely divided composition is optional. However, where it is desired to apply the active ingredient as a dispersion in water, a preferred embodiment of the invention consists of a dust mixture modified with suitable surface-active dispersing agents and employed as a concentrate.

Wetting, emulsifying and surface-active dispersing agents compatible in the present compositions include alkali and alkaline earth metal caseinates, blood albumen, alkali metal salts of long chain aliphatic sulfates, and alkyl aryl sulfonates, partially neutralized sulfuric acid derivatives of petroleum oils and naturally occurring glycerides, sulfonated derivatives of phenols and aromatic acids and their salts, soaps, lignin derivatives, condensation products of alkylene oxides with phenols and organic acids, alkanolamines, complex ether-alcohols and esters, and clays such as bentonite, attapulgite, fuller's earth and the like. In utilizing the clay minerals as dispersing agents, it is frequently desirable to use an excess of the clay over and above the minimum necessary for dispersing the composition, the excess in such case serving as a finely divided diluent.

In an alternative method of carrying out the invention, the chloroaryloxy propanol is compounded with an organic carrier and a wetting and emulsifying agent to prepare an emulsifiable liquid concentrate which is suitable for dispersion in water or dilution with oil to prepare dilute spray mixtures. In this embodiment of the invention, the preferred emulsifying agents are oil soluble and particularly include the non-ionic emulsifiers such as the condensation products of alkylene oxides with phenols and organic acids, polyoxyethylene derivatives of sorbitan esters, complex ether-alcohols and the like. However, oil soluble ionic emulsifying agents such as mahogany soaps from the sulfonation of petroleum may also be used. Suitable organic carriers include petroleum oil and distillates, acetone, lower aliphatic alcohols, liquid halo hydrocarbons and synthetic organic oils.

The proportions of materials employed in the compositions may vary considerably, depending on how the composition is to be employed, and whether or not it is designed as a concentrate. Dust compositions for direct application to soil may contain from as little as 0.25 percent to 50 percent or more by weight of the active ingredient. For use as a concentrate in the preparation of sprays or more dilute dusts, the content of active ingredients may run from 10 percent to as high as 90 to 95 percent by weight, the balance of the composition being one of the diluents and carriers and/or wetting and emulsifying agents previously mentioned. Liquid dispersions of the toxicant in water or an organic solvent similarly may vary in concentration from a very low percentage of the active ingredient, e. g., 0.05 to 15.0 percent by weight where the dispersion is to be applied to the soil, to a relatively high percentage, e. g., 5 to 50 percent by weight, or higher, where the dispersion is to be employed as a concentrate.

The amount of chloroaryloxy propanol to be applied varies considerably depending on such factors as growth conditions, the species to be controlled and whether selective action or temporary sterilization is desired. Good results have been obtained when using from about 1 pound to 200 pounds of the toxic ingredient per acre. Where selective control is desired in vigorously growing crops such as sugar cane or the cereal grains, sensitive species such as mustard and wild lettuce are controlled by application of 1 to 5 pounds of the propanol compound per acre, while 10 pounds or more may be required for selective control of more resistant species. From 50 to 200 pounds per acre is used in effecting temporary sterilization. In operating at the lower dosages commercially useful control of sensitive plants is sometimes obtained through depression of germination and stunting of growth of the sensitive, undesired plants without complete killing thereof since the resistant crop can meanwhile make vigorous growth and successfully compete with the weeds thereafter.

The compositions of the present invention are conveniently applied to or dispersed in the soil by either spraying or dusting. Alternatively, they may be dispersed in irrigation water and so distributed over and thru the soil. The techniques involved in the application of spray and dust materials are well established and conventional equipment suffices in the present situation. It is required, however, that relatively uniform distribution of the treating compositions be obtained and that the compositions as deposited on or in the soil provide a toxic concentration of the active ingredients so positioned as to be contacted by the emerging seedlings of the undesired vegetation. Where dusting is employed, the surface of the soil may be dragged or otherwise worked to distribute the toxicant. In general, the toxic ingredient is distributed through the upper inch of the growth medium when practicing pre-emergent and selective weed control, and it is preferred that the distribution be through the upper ¼ inch to ¾ inch. However, in applying heavier dosages for temporary sterilization, it is sometimes desirable that the substituted propanol compound be distributed through the upper three to six inches of the growth medium.

In one preferred embodiment of the invention, the chloroaryloxy propanol compounds are applied in the form of a dust or spray as set forth above to prepared seed beds previously planted to large seeded resistant crops. In such an application, any distribution procedure such as dragging is carefully controlled so as to avoid disturbing the seed of the desired crop plant, nevertheless, it is desirable that the toxic chemical be distributed thru the uppermost layer of the soil. Thus, the active compound is maintained in the area where it most conveniently controls the emergence of the rapidly germinating small seeded weeds such as purslane, pigweed, chenopodium species and wild mustard, while the more deeply planted crop plant germinates and grows with little or no effect from the chemical. A similar procedure of pre-emergence weed control is suitable for use with crops in which a budded stem portion is planted, for example, with sugar cane and potatoes.

Alternatively, the area to be planted is fitted and the treatment for weed control is carried out two weeks or more before planting with a desired crop and particularly a broadleafed crop. By such a procedure, the weed seedlings in the surface layer of growth medium are controlled and the effect of the chemical is thereafter dissipated. In subsequent planting to a crop a minimum of disturbance of the previously treated surface is desirable in order not to bring to or near the surface new and viable seeds which on germination would yield a fresh stand of undesired vegetation.

The chloroaryloxy propanols are conveniently prepared by reacting an appropriate alkali metal phenolate, such as the sodium or potassium salts of p-chlorophenol, o-chlorophenol or 4-chloro-2-methylphenol, with a monohalopropanol, e. g., 1-bromopropanol-3, propylene chlorohydrin, etc. Alternatively the compounds may be produced by reacting the appropriate phenol with propylene oxide in the presence of a suitable catalyst, e. g., sodium hydroxide or sulphuric acid. The compounds are substantially insoluble in water and soluble in many organic solvents. Representative products are characterized by the following properties:

| Compound | Boiling Point |
| --- | --- |
| 1-(4-chlorophenoxy)-2-propanol | 145.5°–148.5° C. at 10 mm. pressure. |
| 1-(2-chlorophenoxy)-2-propanol | 141°–149° C. at 10 mm. pressure. |
| 1-(4-chloro-2-methyl-phenoxy)-2-propanol | 135° C. at 0.3 mm. pressure. |

Other chloroaryloxypropanols which may be employed as herbicidal toxicants as herein disclosed include 2-(2-chlorophenoxy)-1-propanol, 2-(4-chlorophenoxy)-1-propanol, 2-(4-chloro-2-methylphenoxy)-1-propanol, 3-(2-chlorophenoxy)-1-propanol, 3-(4-chlorophenoxy)-1-propanol and 3-(4-chloro-2-methylphenoxy)-1-propanol.

The following examples illustrate the invention but are not to be construed as limiting:

Example 1

1-(2-chlorophenoxy)-2-propanol and a dispersing and emulsifying agent identified as a dibutylphenolalkylene oxide condensation product were dissolved in toluene to prepare a concentrate composition containing 2 pounds of the substituted propanol and 1 pound of the emulsifying agent per gallon of composition. Portions of this composition were dispersed in water to give dilute spray mixtures containing 1, 2 and 3 pounds of 1-(2-chlorophenoxy)-2-propanol per hundred gallons, respectively. These mixtures were sprayed on areas of moist sandy loam which had been planted 24 hours previously with seed of lettuce, red weed, mustard, bur clover, canary grass and rye grass. The applications were made at the rate of 100 gallons of dilute spray mixture per acre to give dosages of 1, 2 and 3 pounds of active ingredient per acre. On observation after 17 days, it was found that the grasses had emerged and grown as well as the grass seedlings in adjacent untreated check areas. In contrast, there was poor germination of the broadleafed test species in all the treated areas and those seedlings which emerged were stunted and made only about 50 per cent of the growth shown by similar species in the untreated check areas.

Example 2

1-(4-chloro-o-toloxy)-2-propanol was compounded with the dispersing and emulsifying agent of Example 1 and toluene to prepare a concentrate composition containing 2 pounds of the substituted propanol and 1 pound of the emulsifying agent per gallon of composition. Portions of this composition were dispersed in water to prepare dilute spray mixtures containing 1, 2 and 3 pounds of 1-(4-chloro-o-toloxy)-2-propanol per hundred gallons and the resulting mixtures sprayed on areas of moist sandy loam seeded as in the previous example. The rate of application and resulting dosage of active ingredient per acre were as described in Example 1. On observation after 17 days, it was found that the grasses showed emergence and growth equal to that of the grasses in the untreated check areas. In contrast, the broadleafed species in the area treated at the rate of 1 pound per acre showed poor germination and those seedlings which emerged were stunted and grew only to the extent of 50 per cent of the growth made by similar species in the untreated check areas. In the areas treated at rates of 2 and 3 pounds of active ingredient per acre, respectively, no emergence or growth of broadleafed species could be observed.

*Example 3*

1-(4-chlorophenoxy)-2-propanol was compounded with the dispersing and emulsifying agent of Example 1 and toluene to prepare a concentrate composition containing 2 pounds of the substituted propanol as active ingredient and 1 pound of the emulsifying agent per gallon of composition. Portions of this composition were dispersed in water to prepare dilute spray mixtures containing 1, 2 and 3 pounds of the active ingredient per hundred gallons. These spray mixtures were applied at the rate of 100 gallons per acre to areas of moist sandy loam previously seeded as in Example 1. On observation after 17 days, it was found that the grasses showed emergence and growth equal to that in the adjacent untreated check areas. The broadleafed species in the treated areas emerged well but were severely stunted and showed growth to the extent of 25 percent or less of that shown by similar species in the untreated check area.

*Example 4*

1-(2-chlorophenoxy)-2-propanol was dissolved in acetone and applied at the rates of 48 and 192 pounds per acre to areas planted with viable seed of a variety of grasses and broadleafed species. The application was carried out so as to disperse the propanol compound throughout the upper three inches of the soil. At subsequent intervals of approximately 30 days, the treated areas were observed to determine any germination of seed and growth of seedlings. Following each observation, the upper three inches of soil were broken up, thoroughly mixed and replanted with fresh seed as before. The test areas were equipped for overhead irrigation and received the equivalent of about 4 inches of rain per month. At the first examination 30 days after treatment, there were no living plants of any species in the treated areas although the seeds in the area receiving the lower rate of application had germinated and emerged but subsequently died. After 2 further plantings, examination approximately 90 days after the initiation of the test showed no germination or growth of broadleafed species in the area treated at 192 pounds per acre and normal germination and growth of grasses in the area treated at 48 pounds per acre. Grasses in the area treated at 192 pounds per acre and broadleafed species in the area treated at 48 pounds per acre showed poor germination and stunting of the plants which emerged. After the fourth planting, observation in all treated areas 120 days after the initiation of the test, showed normal germination and growth of grasses and poor germination of broadleafed species with stunting of the latter.

*Example 5*

1-(4-chloro-o-toloxy)-2-propanol was dissolved in acetone and applied to an area of sandy loam soil previously planted as in Example 4. The application was carried out so as to disperse the substituted propanol throughout the upper 3 inches of soil and at a rate of 192 pounds of the active compound per acre. Observations and replantings were made as in the preceding example. No live grasses or broadleafed plants were found in the treated areas 30 and 60 days after the initiation of the test. Thereafter grasses and broadleafed species made normal growth although germination of broadleafed species was poor in the planting immediately following the 60 day observations.

*Example 6*

A formulation of the following composition was prepared:

1-(4-chlorophenoxy)-2-propanol _____pounds__ 2
Non-ionic emulsifier _____do____ 1
Toluene to make 1 gallon.

The non-ionic emulsifier used is identified as a dibutylphenol-alkylene oxide condensation product.

The formulation was prepared by mixing the propanol compound, the emulsifier and the major portion of the toluene with stirring at room temperature. The formulation was then completed by diluting to volume with the necessary amount of toluene followed by a final thorough mixing. Portions of the above composition were dispersed in water to prepare aqueous spray emulsions containing 5, 10 and 20 pounds of the propanol compound per hundred gallons. The resulting emulsions were applied in conventional spray equipment at a pressure of 10 pounds per square inch and at a rate of 200 gallons per acre on areas of sandy loam soil which had been planted 24 hours previously with seed of mustard, barley, lettuce, small nettle, redweed, lamb's quarters, bur clover, pigweed, annual blue grass and prickly lettuce. At this rate of application, the dosage of active toxic ingredient was 10, 20 and 40 pounds per acre on the respective areas. On observation two weeks after treatment, it was found that in the areas receiving 20 and 40 pounds of the toxic ingredient per acre there was no emergence or growth of any plants except barley. The latter showed emergence equal to that in adjacent untreated check areas. The barley which emerged was severely stunted by the 40 pounds per acre treatment and somewhat stunted by the 20 pounds per acre treatment. In the area treated at 10 pounds per acre there was no emergence of mustard, small nettle, lamb's quarters, pigweed, annual blue grass or prickly lettuce. In the same area there was straggly emergence of the lettuce, redweed, and bur clover and those plants which emerged were severely stunted. Barley showed 100 per cent emergence in comparison to the untreated check area and the resultant plants showed only slight evidence of stunting.

*Example 7*

5 parts by weight of 1-(4-chloro-2-methylphenoxy)-2-propanol is mixed mechanically with 45 parts by weight of an attapulgite-type clay and 50 parts of pyrophyllite and ground through a hammermill having a 1/16 inch screen to prepare a dust composition. This composition is applied at the rate of 200 pounds per acre and, under sub-tropic conditions, to a field previously planted with stem cuttings of sugar cane. A disk and drag combination is used following the duster to insure uniform distribution of the dust and to mix it into the upper 1/2 to 1 inch of the soil. Later observations show substantially complete control of broadleafed weeds such as redweed, lamb's quarters, mustard and prickly lettuce and of small seeded annual grasses such as annual blue grass with a vigorous stand of the crop plant.

*Example 8*

25 parts by weight of propylene glycol mono(o-chlorophenyl) ether, 1 part of alkyl aryl sulfonate (Nacconal NR), 1 part of Daxad No. 27 (a dispersing agent identified as polymerized sodium salts of substituted benzoid alkyl sulfonic acid) and 73 parts of an attapulgite-type clay are mechanically mixed and hammermilled through a 1/16 inch screen. The resulting wettable powder concentrate is dispersed in water at the rate of 40 pounds per 100 gallons to provide a spray composition containing 10 pounds of the active chlorophenoxypropanol per 100 gallons. This dispersion is sprayed at the rate of 200 gallons per acre on the freshly disked and rolled shoulders of a highway. Inspection after several months shows no invasion of the shoulder area by broadleafed weeds and a very few straggly, stunted grasses growing in the treated strip.

I claim:

1. A method for inhibiting the growth of vegetation which comprises the step of exposing seedling roots and germinating seed to the action of a phytotoxic concentration of a compound having the formula

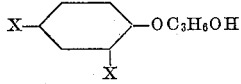

wherein one X represents chlorine and the other X represents a member of the group consisting of hydrogen and a methyl radical, such exposure being accomplished under conditions normally leading to the growth of the vegetation concerned.

2. A method for inhibiting the growth of seedlings which comprises the step of contacting seed, while positioned in a growth medium, with a compound having the formula

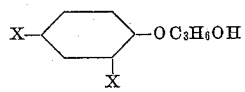

wherein one X represents chlorine and the other X represents a member of the group consisting of hydrogen and a methyl radical, said compound being employed in a growth-inhibiting amount.

3. A method for controlling the growth of undesired vegetation which comprises distributing in the soil and in close proximity to the seeds and the roots of young seedlings of such vegetation a compound of the formula

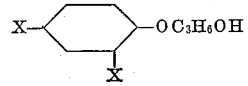

wherein one X represents chlorine and the other X represents a member of the group consisting of hydrogen and a methyl radical, the concentration of the compound in the soil being such as to be toxic to the organs of the seedling plants.

4. A growth-inhibiting concentrate composition comprising an active ingredient in intimate mixture with a surface-active dispersing agent, such agent being capable of facilitating the dispersion of the composition in water, and the active ingredient consisting of a compound of the formula

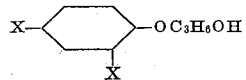

wherein one X represents chlorine and the other X represents a member of the group consisting of hydrogen and a methyl radical, said active ingredient being employed at a concentration sufficient to inhibit the growth of the vegetation concerned.

5. A method for controlling the growth of undesired vegetation which comprises distributing 1-(4-chlorophenoxy)-2-propanol in the soil and in close proximity to the seeds and young seedling roots of such vegetation, the concentration of the substituted propanol derivative in the soil being such as to be toxic to the organs of the plants.

6. A method for controlling the growth of undesired vegetation which comprises distributing 1-(2-chlorophenoxy)-2-propanol in the soil and in close proximity to the seeds and young seedling roots of such vegetation, the concentration of the substituted propanol derivative in the soil being such as to be toxic to the organs of the plants.

7. A method for controlling the growth of undesired vegetation which comprises distributing 1-(4-chloro-2-methylphenoxy)-2-propanol in the soil and in close proximity to the seeds and young seedling roots of such vegetation, the concentration of the substituted propanol derivative in the soil being such as to be toxic to the organs of the plants.

References Cited in the file of this patent

UNITED STATES PATENTS

| | | |
|---|---|---|
| 2,497,636 | Stowell | Feb. 14, 1950 |
| 2,573,769 | Lambrech | Nov. 6, 1951 |

OTHER REFERENCES

Botanical Gazette, vol. 107 (1946), pages 475 to 507.
Beilstein's Handbuch der Organischen Chemie, 1st Supplement to 4th edition, vol. VI, page 101 (1931).